United States Patent [19]
Johnson et al.

[11] 3,811,759
[45] May 21, 1974

[54] DUAL FILM PICTURE VIEWER

[75] Inventors: Robert William Johnson, Levittown; Irvin Paul Shanker, Huntingdon Valley, both of Pa.

[73] Assignee: ESB Incorporated, Philadelphia, Pa.

[22] Filed: Apr. 9, 1973

[21] Appl. No.: 349,017

[52] U.S. Cl.................. 352/79, 352/78 C, 352/194
[51] Int. Cl. .......................................... G01b 41/00
[58] Field of Search............ 352/78 C, 78 R, 79, 80, 352/174, 176, 104, 191, 194, 195; 226/64

[56] References Cited
UNITED STATES PATENTS

| | | | |
|---|---|---|---|
| 3,482,909 | 12/1969 | Becker | 352/79 |
| 3,514,196 | 5/1970 | Roman | 352/79 |
| 3,460,730 | 8/1969 | Krumbein | 352/80 X |
| 3,672,752 | 6/1972 | Young et al. | 352/78 R |
| 3,427,101 | 2/1969 | Jorgensen et al. | 352/79 |
| 3,510,212 | 5/1970 | Krumbein et al. | 352/160 |
| 3,677,628 | 7/1972 | Walker | 352/174 X |
| 3,338,490 | 8/1967 | Hara | 226/64 |
| 3,669,532 | 6/1972 | Figge et al. | 352/78 C |
| 3,449,044 | 6/1969 | Caprio | 352/79 |
| 3,536,388 | 10/1970 | Pickens et al. | 352/79 |

FOREIGN PATENTS OR APPLICATIONS

| | | | |
|---|---|---|---|
| 1,251,653 | 10/1967 | Germany | 352/78 C |

*Primary Examiner*—Fred L. Braun
*Assistant Examiner*—Alan Mathews

[57] ABSTRACT

A compact device projects Standard 8 and Super 8 film on a self contained screen. The films are continuous and are contained in individual film cartridges. Insertion of the film cartridge serves to adjust the viewer for the particular film contained therein.

The adjustments include setting of mask size, mask position, image position on screen, stopping point of the film advance claw, adjustment of film advance stroke and lateral position of the film advance claw. The viewer will advance the film even when the film advance opening is damaged.

5 Claims, 14 Drawing Figures

DUAL FILM PICTURE VIEWER

BACKGROUND OF THE INVENTION

1. Field of the Invention

This invention relates to motion picture viewers. In particular, it relates to a projector suitable for projecting two different sizes of film on a self contained screen.

2. Description of the Prior Art

Several styles of dual film projectors are known. In all of these, it is necessary to make one or more manual adjustments when changing from one style film to another. The several styles of projectors have differing features in order to accommodate the two film sizes. One such projector has duplicate film advance devices, one for each film. A second projector has a single advance device with a narrow claw and adjustment for framing only. A third device has full adjustment of stroke, and lateral and longitudinal location of the film advance claw.

Film advance openings are occasionally damaged causing loss of film advance. The usual causes for this damage include faulty adjustment of film position, insufficient claw protrusion, bad splices and occasionally blisters caused by overheating of the film. Dual film projectors are known having double claws so as to provide a back-up in case a film advance opening is damaged. In these projectors, it has been disclosed to have two complete film advance levers, one for Standard 8 and one for Super 8 film.

A particular class of motion picture film projectors has been developed for educational work. In this class of projector, it is customary to have a screen built into the projector so that the device becomes a projector-viewer. The screen in this form of device is often a translucent glass or plastic plate in which case the picture is projected on the back of the plate and viewed from the front. Projectors so made can be compact and portable.

For educational use it is very desirable to have the projector viewer adaptable to both Standard 8 and Super 8 mm film. Short educational films are often packaged in small plastic film cartridges. The films are continuous and the cartridges are so made that they can be positioned in a suitable projector without going through the difficult operation of film threading as is done with many home style motion picture projectors.

With dual film projectors presently available, it is necessary when going from Standard 8 mm to Super 8 mm to make several adjustments. The film advance stroke must be properly set, the framing position of the image must be set and a mask must be interposed or removed to give the correct image size on the screen. For educational purposes, especially for younger students, these adjustments may not be properly made, resulting in a reduced quality of presentation often accompanied by loss of interest on the part of the student.

Dual film projectors are known in which a film advance claw is made narrow enough to fit within the overlap of the two film openings. It has also been disclosed to make a dual type projector having a fixed film advance stroke but having an adjustment in the claw pivot to film distance so that the actual contact distance between claw and film can be set for either of the two films. Such mechanisms are simple to make. It will be seen, however, that this simplified stroke adjustment results in the engagement of the film by the advancement claw while the claw is actually in rapid movement. The force on the film caused by the intense acceleration at the time of contact, puts an undue strain on the film where it is contacted by the claw. The effect is further magnified by the use of the narrow claw which puts an additional local strain on the edge of the film advance opening. The net result is that the film life expectancy with such projectors is comparatively short.

SUMMARY OF THE INVENTION

An improved dual film viewer projects the images of a photographic film on a viewing screen. A first film in a first shape of cartridge or a second film in a second shape of cartridge may be positioned in the projector.

The projector includes a means for identifying the cartridge positioned therein. The means for identifying is operatively connected to a means for adjusting a film projection characteristics of the projector to suit the film contained in the cartridge. The insertion of the film cartridge serves to set the necessary adjustments and in a second embodiment to put the viewer in operation. Finally, a means is provided to drive the film when a film advance opening is damaged.

From this description, it will be seen that a unique projector-viewer is described having particular application in high volume individual instruction educational methods. The operation of the projector is so direct and simple that anyone can operate it, regardless of mechanical ability, etc. Further, it prevents the loss of attention from the subject matter of the film due to the need for adjustment as would be found in a non automatic device. With the short films of the class described, this is particularly significant. As with any classroom device, it is designed for and can be expected to receive hard useage. It gives a minimum of wear and tear on the films with which it is used.

DESCRIPTION OF THE PREFERRED EMBODIMENT

Figure 1:
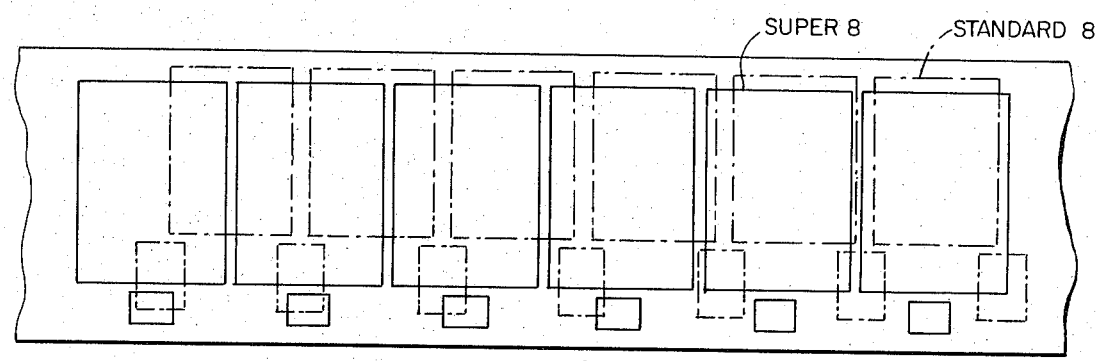
FIG. 1 (not part of the invention) shows a portion of Super 8 mm film superimposed on a portion of Standard 8 mm film.

FIG. 1 (not a part of the invention) shows a section of Super 8 film (solid lines) superimposed on a section of Standard 8 film (dotted lines). Both films are shown in a considerably enlarged form and at the same scale. A first projectable picture of each film is centered at the right end of the figure. At the left end of the figure, the center of a Standard 8 picture is shown located at the boundary of two Super 8 pictures. Five Super 8 pictures occupy the same length of film as five and one half Standard 8 pictures. Next it can be noted that the lateral center of the Standard 8 picture is nearer the top of the film than the lateral center of the Super 8 picture. The film advance opening of the Standard 8 film is centered longitudinally at the boundary of two pictures whereas the film advance opening of the Super 8 is located longitudinally at the center of the Super 8 picture. The lateral location of the two film advance openings is different and the opening of the Standard 8 film is longer and wider than the opening of the Super 8 film. There is a lateral overlap of the two film advance openings amounting to about 0.025 inches. This is about five-ninths of the opening of the Super 8 film and two-sevenths of the opening of the Standard 8 film.

Thus, it can be seen that for proper projection of both Standard 8 and Super 8 film in a single projector the following adjustments must be made:
  a. an adjustment of frame mask size;
  b. an adjustment of frame mask position;
  c. an adjustment of the location of the image on the viewing screen;
  d. an adjustment of the stopping point or longitudinal position of the film advance claw with relation to the frame center;
  e. an adjustment of the stroke of the film advance claw.

It is also desirable, in order to provide the greatest possible width to the film advance claw that
  f. the film advance claw should be adjustable in the lateral direction.

For purposes of definition in this specification, the several dimensions as outlined above, along with all other physical differences by which films such as the Standard 8 and the Super 8 film differ, are hereinafter termed the Film Projection Characteristics of the particular film. A picture is defined as the portion of a film which is to be projected and enlarged by the projector and an image is the enlargement of the picture as focused upon the viewing screen.

Figure 2:
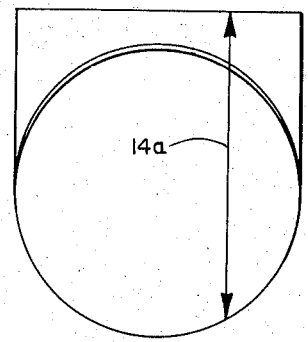
FIG. 2 (not a part of the invention) shows the outline in plan of a Standard 8 film cartridge.

FIG. 2 (not a part of the invention) shows in plan a type of film cartridge used for holding a Standard 8 film. As shown, the plan of the cartridge is in the form or portion of a rectangle having a top joined to a circular portion extending through an angle approximately 180° and forming a bottom of the plan view.

Figure 3:
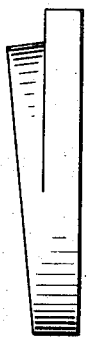
FIG. 3 (not a part of the invention) shows the outline in elevation of the cartridge of FIG. 2.
Figure 4:
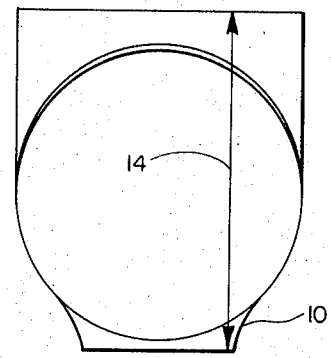
FIG. 4 (not a part of the invention) shows the outline in plan of a Super 8 film cartridge.
Figure 5:
FIG. 5 (not a part of the invention) shows the outline in elevation of the cartridge of FIG. 4.

An elevation of the same cartridge is shown in FIG. 3. In the particular form of cartridge as particularly adapted to the projector of the present invention, the film in the cartridge is continuous, i.e., it is one single loop of film without ends or endless. The interior construction details of such a cartridge are shown in U.S. Pat. No. 3,206,757. FIGS. 4 and 5 (not a part of the invention) show in plan and elevation a similar type of cartridge as used for holding Super 8 film.

In the plan view, FIG. 4, the rectangular top of the cartridge is identical to that of FIG. 2. However, at the bottom on that portion 180° from the top, there is a protruding shoulder 10. The shoulder merges into the circular sides of the cartridge each circular side including an arc of less than 90°. The shelf forms a distinguishing feature by which the Super 8 cartridge can be easily differentiated from the Standard 8 cartridge. Other dimensions and features of the two cartridges are practically identical.

Although the Super 8 cartridge is easily differentiated from the Standard 8 cartridge by sight, for purposes of a mechanical differentiation one or more measurable dimensions must be chosen from the several differing dimensions of the two cartridges. One convenient dimension is the length of the cartridge measured at a selected distance from and parallel to the centerline of the cartridge in plan perpendicular to the top of the rectangular portion of the respective cartridges such as the dimension 14 of FIG. 4. The corresponding dimension of the Standard 8 cartridge is shown in FIG. 2 as 14a. The dimension chosen as a means of distinguishing one cartridge from another will be henceforth termed the Identifying Dimension of the cartridge.

Figure 6:
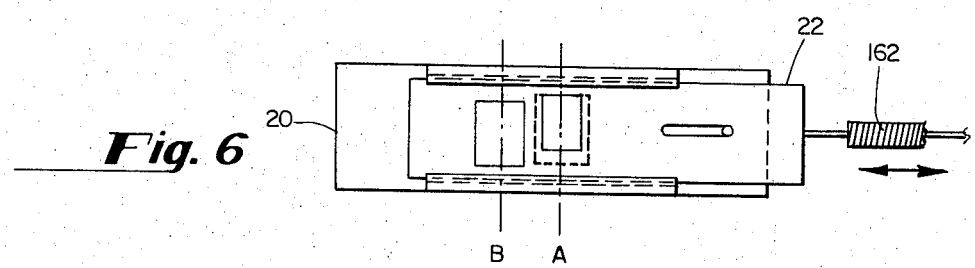
FIG. 6 shows a view of a masking means suitable for the viewer of the invention.

The frame mask of a projected optical image can best be located at or near either of the two focal planes, i.e., the object plane where the film is located or the image plane where the screen is located. In either of these positions, the frame and hence the borders of the projected image will be in sharp focus. If the frame is not located at or near a focal point, the edge of the image will be indistinct. A particular embodiment of an adjustable frame mask is shown in FIG. 6. A first mask plate 20 is firmly mounted in the projector. A second mask plate 22 is located directly below plate 20 and is slidably mounted thereon. A gibbed slide holder is shown in FIG. 6. Plate 22 has two principal positions, one as shown which provides a suitable frame mask for Standard 8 film and a second position where index line B of plate 22 is directly over index line A of plate 20 which provides a suitable frame for Super 8 film. The two mask plates are conveniently located in a projection light path just above the film and so that extensions on plate 20 serve to hold the film on the focal plane of a projection lens. Thus, by sliding plate 22 from the position shown to the position of B over A, the frame mask is changed from a Standard 8 to a Super 8 mask. This represents only one possible means for setting the frame masks. It has the desirable feature of requiring only a small movement of the slide plate 22 to effect the change from position B to position A. Also additional frame openings may easily be provided in the sliding plate 22 to provide for other picture sizes and locations. However, and as indicated above, masking can be done, for example, at or near the image plane near the translucent screen. The lateral centers of Super 8 and Standard 8 film pictures are not the same, therefore, the mask frame openings have different centers as shown.

Figure 7:
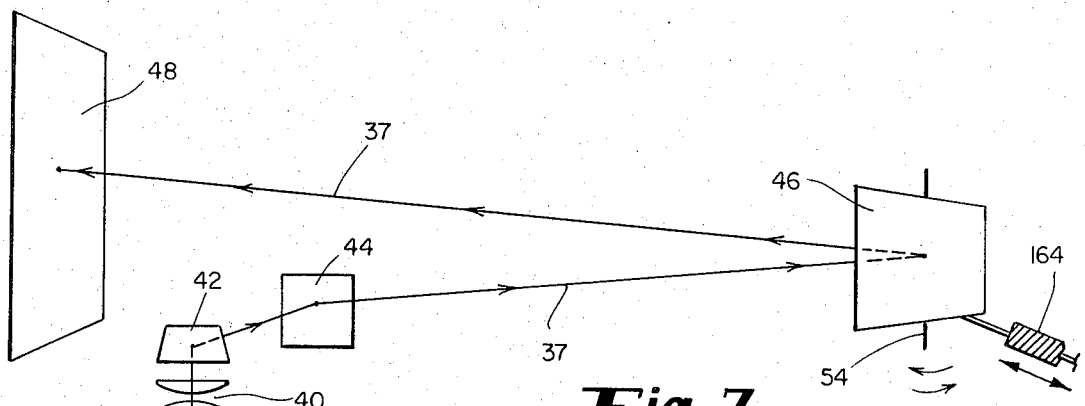
FIG. 7 shows in perspective a preferred light path for a viewer according to the invention.

FIG. 7 shows in diagramatic form the light path of an optical projection system suitable for a projector of the present invention. A transparent photographic picture 30 is located on a film 32. A light bulb 34 supplies light to a condensing lens 36. For convenience, a single central ray 37 of the light is shown in FIG. 7. The ray is bent by a first mirror 38, passes through the film 32, mask plate 22, passes through shutter 103 and goes on to the projection lens 40. Following this, the ray is bent again by second mirror 42, and again by third mirror 44. The ray emerging from mirror 44 falls on fourth mirror 46 which reflects it almost directly back to a viewing screen 48. The location and optical constants of projection lens 40 are such that the picture 30 on the film 32 is projected on screen 48 so as to form an enlarged image thereon. It is apparent that the tortuous light path described will shorten the overall viewer size when compared to a direct light path. Screen 48 may be light reflective or light transmitting. In the first case, it must be viewed from the ray side (right in FIG. 7) and in the second case it should be viewed from the left side as shown in FIG. 7.

Figure 8:
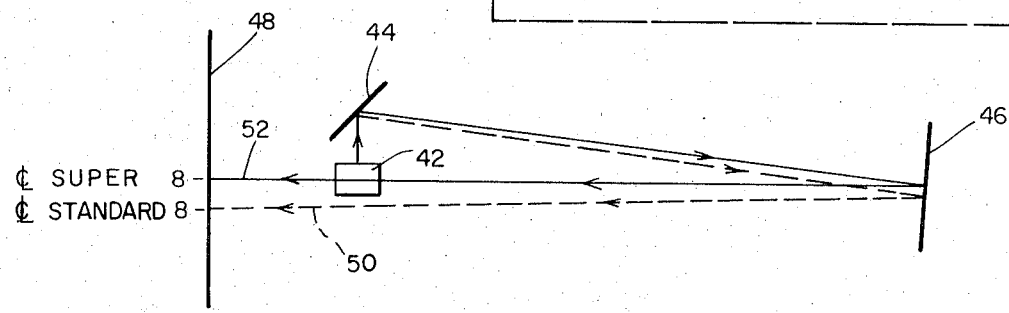
FIG. 8 shows a further detail of the light path of FIG. 7.

FIG. 8 shows a top view of a part of the optical path of FIG. 7. Mirrors 42, 44 and 46 are shown as well as screen 48. The light ray 50 (dotted), represents the central ray of the image of a Standard 8 film. When a Super 8 film is introduced into this optical system, the central ray of its image will be as shown by rays 52. Because of the relative locations of the pictures on the film discussed above, the center of the Super 8 image will be located somewhat to the left of the center of the Standard 8 image when the screen is viewed from the side away from the projector. It is desirable that both images are centered. A change of position of any of the optical parts could be used for the adjustment. In particular, a rotation of mirror 46 on a vertical axis through a small angle will make the required correction. In FIG. 7, mirror 48 is shown rotatably mounted on axis 54.

A simple form of film advance motion has been developed by others wherein a film advance claw, acting as a simple lever, is made to follow a path that is a short portion of a circle by the action of a first cam. A second cam acts on a section fulcrum point of the claw to give it a motion at right angles to the motion of the first cam. The net result is that the film advance claw follows a more or less rectangular path.

Figure 10:
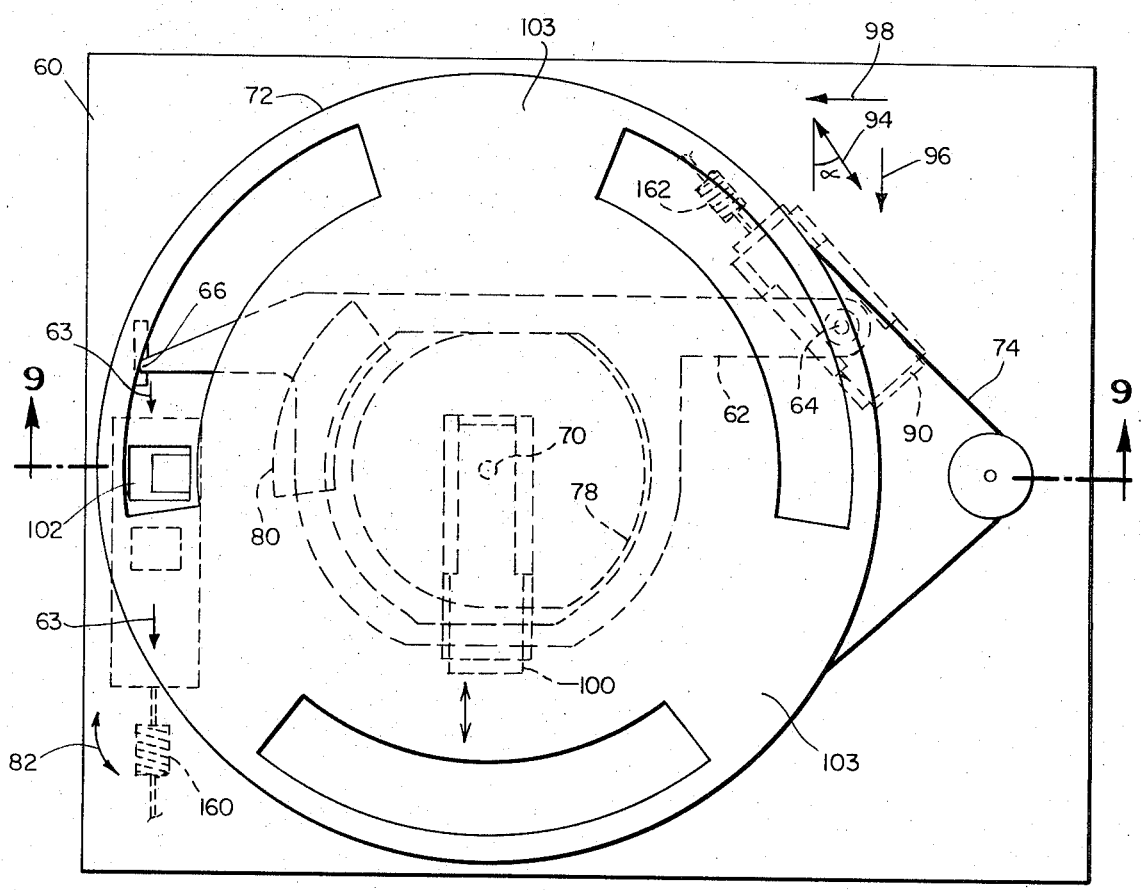
FIG. 10 shows in plan the film advance means of FIG. 9 including the film advance adjustment means of the invention.
Figure 9:
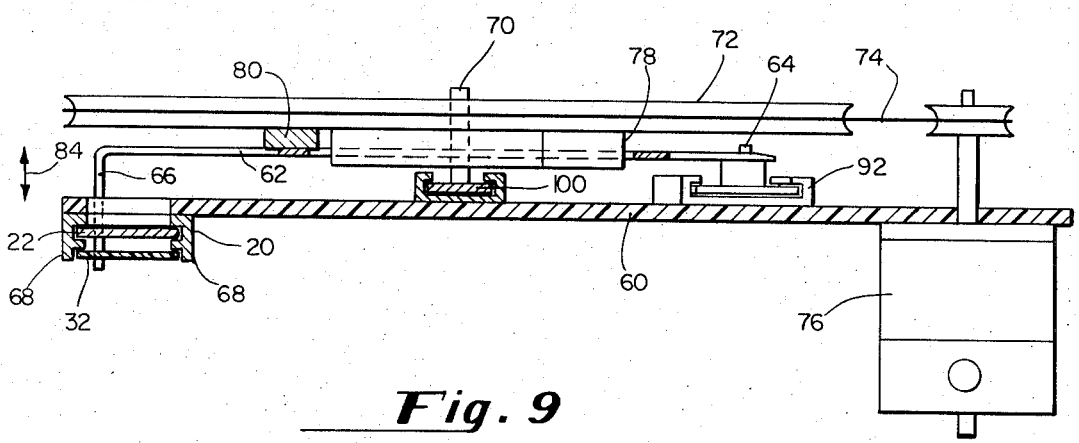
FIG. 9 shows in elevation a film advance means suitable for use with the invention.

In FIG. 9 (axial sectional view) and FIG. 10 (top view) a base plate 60 is shown. A film advance claw 66 is formed on the end of lever 62 and moves the film along the path 63. The first mask plate 20 is located beneath base 60. Gibs formed in the sides 68 of mask plate 20 support the second mask plate 22. Guides also formed in sides 68 position the film 32 directly under the mask plates 20 and 22. A cam shaft 70 is mounted vertically on base 60. A wheel 72 mounted on shaft 70 is driven at a constant speed by belt 74 and electric motor 76 also mounted on base 60. Two cams 78 and 80 are formed on the underside of wheel 72. Cam 78, termed the film advance cam, causes the claw 66 to follow the path indicated by arrow 82. Lever 62 may be biased against cam 78 by a spring (not shown) or it may be a divided lever as shown encompassing the cam to provide a positive return stroke. Cam 80, termed the film engagement cam, causes the claw 66 to follow the path indicated by arrow 84. The use of the two cams as described causes the claw 66 to describe a rectangular path. This action is well known in the film projection art.

In the present invention, the location of the pivot 64 is made to be adjustable on a path at an angle $\alpha$ to the path 63 of the film 32 as shown by slide 90 and gibs 92 as shown by arrow 94. A downward change in the position of pivot 64 as shown by arrow 96 will cause the rest point of claw 66 to move upward. A change in the pivot position to the left as shown by arrow 98 will cause the path of claw 66 to move to the left. However, at the same time, moving the pivot 64 to the left will increase the stroke of the claw. By proper choice of the two positions of pivot 64, the correct film advance and the correct frame location for both Standard 8 and Super 8 film may be obtained. Further, due to the transverse positioning of claw 66, it is possible to make use of the maximum thickness of the claw so that the pressure of the claw on the film is distributed. This reduces the wear on the film and results in extended film life. Additional adjustment of the motion and location of the claw may be obtained by altering the position of the cam shaft 70 with respect to the position of pivot 64. As shown in FIG. 9 and 10, shaft 70 is mounted on a sliding plate 100 and is moveable in a direction parallel with the motion of film 32. This allows for correction of deviations in the picture-film advance hole relationship of a particular film. The film advance opening of Super 8 film is smaller than the advance opening of Standard 8 film. If it were not for other limitations, it would in general be desirable to have the center of the film advance claw located on the longitudinal centerline of the two openings so as to give maximum side clearance, equal stress on each edge of the opening, etc. However, in practice it may be undesirable and it may not even be possible to have the claw at the exact centerline of the two openings due to the limitations imposed by the three adjustments to be made in motion and position of the claw.

It must further be pointed out that the claw at the end of the film advance lever as described, and directed at right angles to the length of the lever describes an arcuate path as indicated by arrow 82. Therefore, the exact transverse location of the claw with respect to the film opening is continually changing during its stroke. The claw must be thin enough so that it has clearance for this lateral motion in the film advance opening.

As has been pointed out, it is possible to make a single change in the pivot point of the film advance lever serve to change the lateral location of the claw, the longitudinal location starting (and hence stopping) points of the claw and also adjust the stroke of the claw. In the present invention, and in order to have a reasonable size of film advance lever, it has been found necessary to have the film advance claw located near the nearer edge of the film advance openings of both films at the start and finish of the stroke, and toward the outer edge of the openings in the middle portion of the stroke. If the two claw locations are not as called out above, the stroke, the location or the longitudinal starting and stopping points of the claw will not be correct.

An opening 102 allows the light beams to pass through base plate 60. Wheel 72 extends out over the opening 102. This wheel has rather large spokes 102 which serve as a shutter to interrupt the light beam at the time the film is being advanced. As a refinement, the spokes 103 can be given a tilt so that they serve as a propellar type fan and circulate the air in the vicinity of the motor and the projection bulb.

To provide for the six desired adjustments of the projection system to accommodate the Film Projection Characteristics of two particular films, the present invention requires changing the position of three components, namely, the location of the pivot point of the film advance lever, the position of one of the reflecting surfaces and the insertion of a suitable frame mask, an additional adjustment of the camshaft with respect to the advance lever pivot may also be desirable. The same adjustment means are available to accommodate films having third or fourth, etc. Film Projection Characteristics.

A further facet of the present invention includes the automatic setting of the projector to accommodate a film having a particular set of Film Projection Characteristics. This can be done by means of one or more cartridge sensing fingers. The fingers are arranged to engage one or more portions of the film cartridge as the cartridge is being placed in the projector and by utilizing the motion of the cartridge insertion by the location of the bearing points of the sensing fingers on the cartridge and by suitable linkages set the positions of the several adjustable members of the projector for the particular Film Projection Characteristics delineated by the cartridge. Thus it is seen that when a cartridge is placed in the viewer the sensing fingers effectively measure the Identifying Dimension of the cartridge and cause the adjustment of the Film Projection Characteristics of the viewer as required to project the film therein.

In a projector adapted to take two or more styles of film it is a convenience to have a rest setting of the projector suitable for a first film type to which the several adjustable parts are returned by spring bias means and requiring no adjustment upon insertion of a cartridge containing the first film type. Adjustment is needed only when a second type of film is to be projected.

Figure 11:
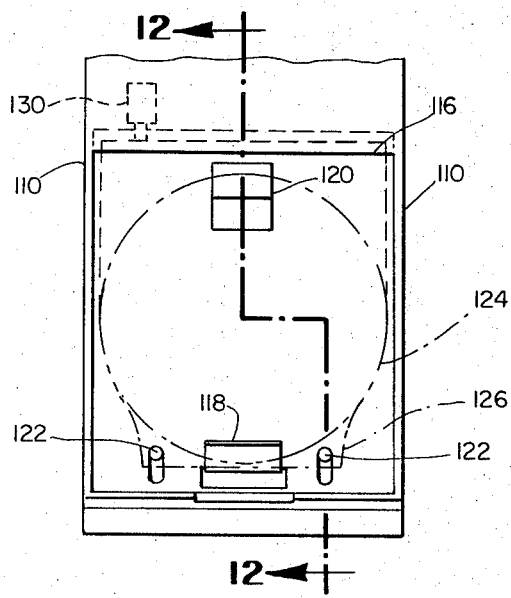
FIG. 11 shows in front elevation the cartridge cavity of the viewer of the invention.
Figure 12:
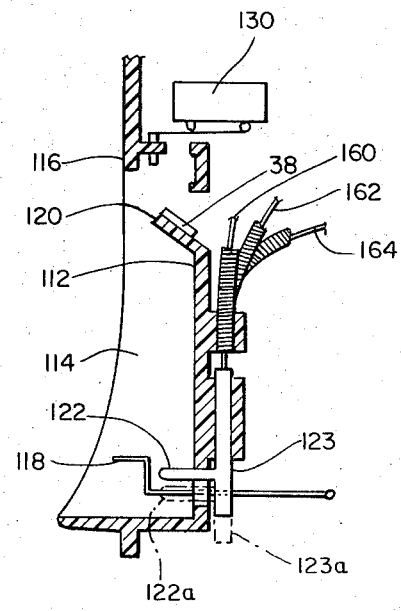
FIG. 12 shows a cross section of the cavity of FIG. 11.

FIG. 11 indicates the front view of a film cartridge well forming a part of a projector. FIG. 12 indicates a section 12—12 of FIG. 11. Side walls 110 and back wall 112 form an open cavity 114 of a size to accommodate the film cartridge. A lip 116 and spring clip 118 serve to hold a film cartridge in the viewer. Projection 120 contains mirror 38 by which the light beam is directed through the film. In order to place a film cartridge in the viewer, the cartridge is entered with the bottom forward so as to engage spring 118 and sensing fingers 122. Both spring and fingers are then depressed by the bottom of the cartridge so as to enable the top of the cartridge to be pushed under lip 116. The spring 118 then raises the cartridge and holds it in place. The sensing fingers 122 lead to a sliding member 123 to which are fastened linkages going to the three moveable members 22, 46, and 90 by which adjustment is made for the Film Projection Characteristics of the film contained in the cartridge. When a cartridge such as shown in FIG. 2 and shown in dotted lines 124 in FIG. 11 and containing a Standard 8 film is positioned in the viewer, the bottom cylindrical edge of the cartridge is pushed by spring 118 above the top rest point of the sensing FIGS. 122. The top rest position of slide 123 and the accompanying linkages is such that the three parts 22, 46, and 90 are in the proper location for projecting Standard 8 film. When a cartridge such as shown in FIG. 4 and in dashed lines 126 containing Super 8 film is located in the projector, the shelf 10 engages the fingers 122 so as to hold the slide 123 a predetermined distance down from the rest point. This position of the slide and the accompanying linkages is such that parts 22, 46 and 90 are in the proper relationship for projecting Super 8 film. As an alternate, when a Standard 8 cartridge is placed in the viewer, the sensing fingers can be held downwards from the rest point by a preselected distance. In this embodiment, the position of the fingers 122, the slide 123 and the linkages is set to be correct for projecting Standard 8 film. The linkages used to carry motion from slide 123 to the parts 22, 46 and 90 may be a series of levers, links, shafts, etc. A preferred linkage means is by the use of flexible motion transmitting cables or Bowdwin wire, 160, 162 and 164 leading to the slide 22, the mirror 46 and the slide 90 as shown.

In a further embodiment of the invention, a switch 130 is located with reference to cavity 114 such that as either cartridge 124 or 126 is finally seated in the cavity 114 the switch is closed causing the projector to turn on and continue in operation until the cartridge is removed.

In a further embodiment of the present invention and suitable, in particular, for a dual viewer projecting Standard 8 and Super 8 films, means are provided for advancing the film even when a film advance opening has been damaged. In this embodiment, the film advance claw is made double as shown in FIG. 14.

Figure 14:
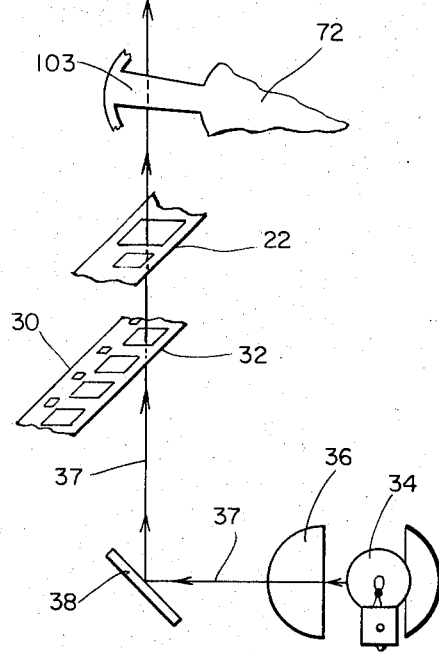
FIG. 14 depicts an alternate embodiment of the film advance claw.
Figure 14:
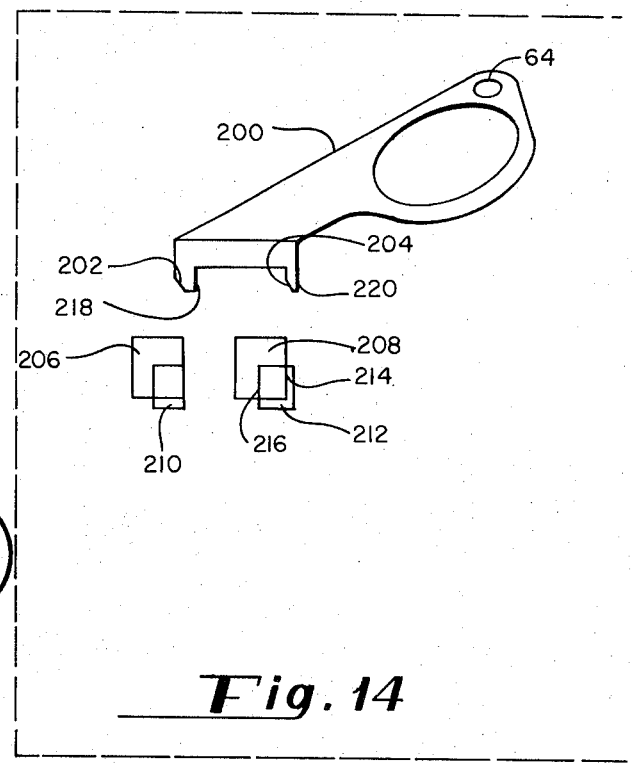

In FIG. 14, 200 represents a film advance lever having two claws 202 and 204 located at the end of lever 200 projecting at right angles thereto, the two claws being located on the same radius about pivot 64. Claw 202 is positioned in the same location as Claw 66 of FIGS. 9 and 10. Claw 204 is located approximately one frame nearer the light path of the projector than Claw 202. Alternatively, it may be located about one frame further away from the light path. An inspection of FIG. 1 shows that at the left hand side where the fifth and sixth Super 8 pictures lie, the film advance openings of the Standard 8 and Super films overlap.

Referring to FIG. 14, 206 represents a first film advance opening of a Standard 8 film and 208 a second. 210 represents a first film advance opening of a Super 8 film and 212 a second. The width, or dimension, parallel to the length of the film of Claws 202 and 204 must not be greater than, and is generally slightly less than, the distance between the leading edge 214 of Standard 8 opening 208 and the trailing edge 216 of Super 8 opening 212. The spacing between the leading edge 218 of Claw 202 and the leading edge 220 of Claw 204 as measured parallel to the length of the film is slightly less than the center to center distance of the Standard 8 film.

Because Standard 8 and Super 8 films are already extant, actual dimensions can be selected for the two critical dimensions of the double claws. For a double claw to effectively operate for both Standard 8 and Super 8 films, the spacing between the leading edges of the two claws must be about 0.144 inches. The width (as defined above) of the two claws must not be greater than about 0.020 inches. These values allow for normal manufacturing tolerances both for the film and for the claws.

In use, the film advance Claw 202 usually serves to advance the film, either Standard 8 or Super 8. If by chance a film advance opening under Claw 202 is damaged, Claw 204 will pick up the film and cause it to advance. Claw 202 will pick up a new opening on the subsequent advance stroke of lever 200. Thus, it is shown that a single configuration of double claw film advance can be used without adjustment to drive either of the two film formats and that such a double claw advance will span a damaged film advance opening.

Figure 13:
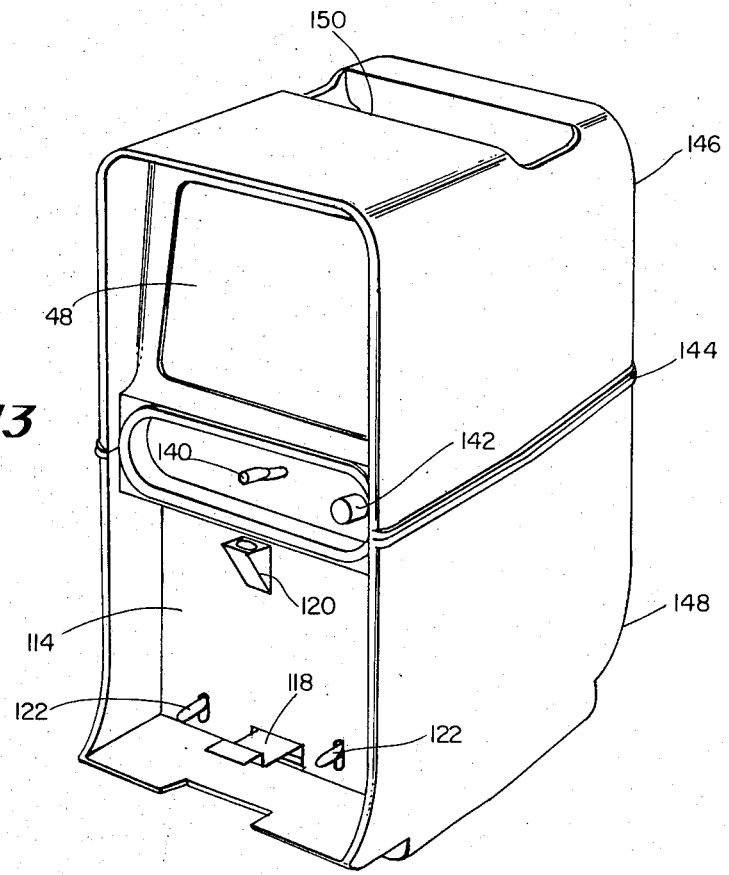
FIG. 13 shows a completed viewer with cartridge cover removed incorporating the features of the invention.

An assembled viewer embodying the features of the present invention is shown in FIG. 13. The viewing screen 48 is shown located in the upper portion of the viewer and the film cartridge well 114 is located beneath it. A focus adjustment lever 140 provides means for changing the position of the projection lens relative to the film. Knob 142 provides auxiliary frame position adjustment by altering the position of shaft 70. The base plate 60 is located approximately at the dividing line 144 of the top 146 and bottom 148 portions of the casing. A lifting handle and hot air outlet 150 is formed in top portion 146. Sensing fingers 122 and mirror carrier 120 are shown located in the cartridge well.

Having described our invention and having given a description of its embodiment, we hereby claim:

1. In a dual film motion picture viewer for projecting on a self contained viewing screen the images of a first series of photographic pictures formed on a first continuous photographic film moving along a path, the first film having a first film advance distance, a first film rest point and a first film advance opening position spaced a first distance from the center line of said path and for projecting the images of a second series of photographic pictures formed on a second continuous photographic film moving along said path, the second film having a second film advance distance, a second film rest point and a second film advance opening position spaced a second distance from the center line of said path the improvement which comprises:
   a. a film along said path advance lever for advancing the film, the lever having a claw end and a pivot end,
   b. a film advance lever cam for causing the claw end of the film advance lever to advance a distance and stop at a rest point; and,
   c. a film advance lever pivot for positioning the pivot end of the film advance lever a slide positioned in said viewer, the pivot being moveably mounted in said slide, the slide being so located that when the pivot is in a first position in the slide the claw end of the lever will lie in the first film opening position and by the action of the cam the claw will advance the distance of the first film advance distance and will rest at the first rest point and when the pivot is in a second position in the slide the claw end of the lever will lie in the second film opening position and by the action of the cam the claw end of the lever will advance the distance of the second film advance distance and will rest at the second rest point.

2. A dual film motion picture viewer as defined in claim 1 wherein the first film is contained in a first film cartridge, the first film cartridge being suitable for location in the viewer for projecting the film therein, the first film cartridge having a first identifying dimension; the second film is contained in a second film cartridge, the second film cartridge being suitable for location in the viewer for projecting the film therein, the second film cartridge having a second identifying dimension, the viewer further including:
   a. a means for identifying the identifying dimension of the cartridge located in the viewer; and,
   b. a positioning means operatively connected to the means for identifying, the positioning means positioning the film advance lever pivot at the first position when the means for identifying identifies the first identifying dimension and positioning the film advance lever pivot at the second position when the means for identifying identifies the second identifying dimension.

3. A dual film motion picture viewer as defined in claim 2 including a tortuous light path, for conveying the image of the picture to the screen, a mirror forming a part of the tortuous light path, the mirror being mounted on an axis, and a means for rotating the mirror through an angle about the axis, the means for rotating being operatively connected to the means for identifying the identifying dimension of cartridge located in the viewer.

4. A dual film motion picture viewer as defined in claim 3 including a plurality of frame masks and a frame mask selection and positioning means, the frame mask selection and positioning means being operatively connected to the means for identifying the identifying dimension of the cartridge located in the viewer.

5. A dual film motion picture viewer as defined in claim 4 wherein the first film is Standard 8 mm film and the second film is Super 8 mm film.

* * * * *